United States Patent
Wheelock

[11] 3,860,482
[45] Jan. 14, 1975

[54] REACTOR REACTIVITY CONTROL BY COOLANT PASSAGE COATING

[75] Inventor: Clifford W. Wheelock, Canoga Park, Calif.

[73] Assignee: The United States of America as represented by the United States Atomic Energy Commission, Washington, D.C.

[22] Filed: Sept. 25, 1957

[21] Appl. No.: 686,262

[52] U.S. Cl. .................................. 176/22, 176/86 L
[51] Int. Cl. .............................................. G21c 7/22
[58] Field of Search ........... 204/154.3; 176/22, 86 L

[56] References Cited
UNITED STATES PATENTS

| | | | |
|---|---|---|---|
| 2,735,811 | 2/1956 | Weinberg et al. | 204/154.3 |
| 2,874,109 | 2/1959 | Cooper | 204/154.3 |
| 2,917,444 | 12/1959 | Dreffin | 204/193.3 |

OTHER PUBLICATIONS

Zinn et al., Nuclear Science and Engineering, Vol. 1, (No. 5, Oct. 1956), 420, 428, 434–436.
ANL-5244(Del 2), USAEC Report by Breden et al., dated Nov. 1955, declassified Mar. 18, 1957, page 24.
NAA-SR-276(Del), Reactor Safety Quarterly Progress Report, May–July 1953 edited by Huston, submitted Oct. 20, 1953, issued Jan. 1, 1954, declassified Mar. 1957, pages 9 and 10.
Atomic Energy Commission Document: KAPL-M-LBV-7, Reactor Safety Fuses Sept. 23, 1955 Declassified Apr. 4, 1957, pp. 28 and 29.

*Primary Examiner*—Harvey E. Behrend
*Attorney, Agent, or Firm*—John A. Horan; F. A. Robertson

[57] ABSTRACT

A method of controlling reactivity in a nuclear reactor which is cooled by water flowing through coolant channels within the reactor core, said coolant channels being of a metal selected from the group consisting of aluminum and stainless steel, which comprises providing a neutron absorbing solution consisting of a cadmium compound selected from the group consisting of cadmium chloride and cadmium fluoborate, together with hydrogen fluoride, said solution being about 3 molar in the cadmium compound and about 1 molar in hydrogen floride injecting said solution at a predetermined flux level into said water flowing through said coolant channels, circulating said solution through said channels and thereby causing at least part of said cadmium from said solution to deposit on the interior walls of said channels, thereby reducing the neutron multiplication factor of said reactor.

1 Claim, 1 Drawing Figure

PATENTED JAN 14 1975
3,860,482
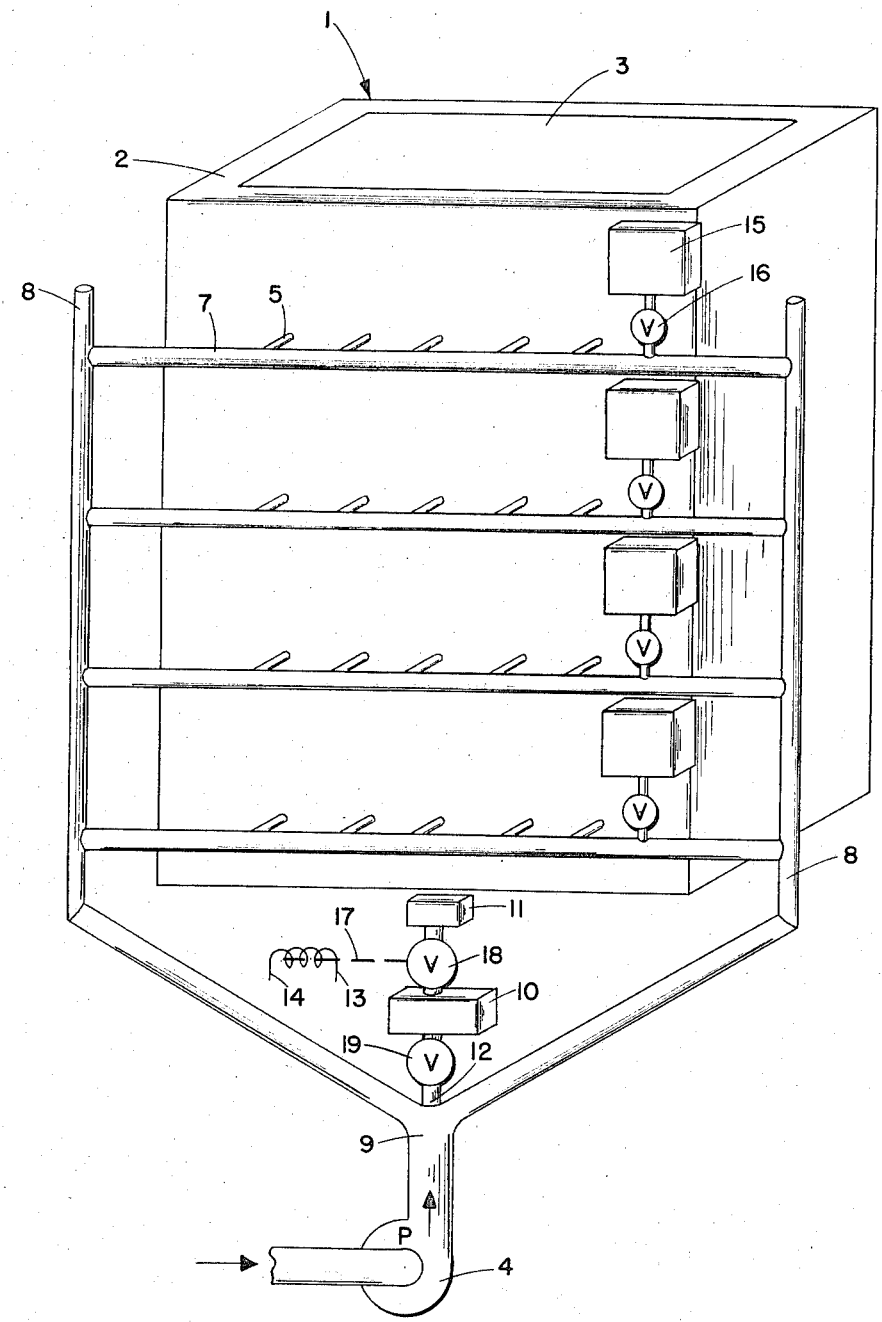
INVENTOR.
CLIFFORD W. WHEELOCK
BY
*William R Lane*
ATTORNEY

REACTOR REACTIVITY CONTROL BY COOLANT PASSAGE COATING

The present invention concerns a method of controlling the reactivity of a nuclear reactor, and more particularly to a method providing a supplementary control system for a nuclear reactor.

For information concerning the theory, construction and operation of nuclear reactors, reference is made to Glasstone, "Principles of Nuclear Reactor Engineering," (D. Van Nostrand Co.); "The Reactor Handbook" (3 volumes), available for sale from the Technical Information Service, Oak Ridge, Tenn.; U.S. Pat. Nos. 2,708,656 and 2,714,577 to Fermi et al.; and to "The Proceedings of the International Conference on Peaceful Uses of Atomic Energy," August, 1955, Geneva, Switzerland, available for sale at the United Nations' Book Store, New York, N.Y.; and to the references cited therein.

A nuclear reactor is normally supplied with more reactivity than is needed to initiate a chain fission reaction (to go "critical"). The term "reactivity" is generally defined as the relative excess multiplication constant, the multiplication constant being the ratio of the number of neutrons of any one generation to the number of the immediately preceding generation, an effective multiplication constant ($K_{eff}$) of 1 being necessary to sustain the chain reaction. There are several reasons why excess reactivity is built into a nuclear reactor. As the reactor is operated, fission products are formed which compete with the fissionable material in the absorption of neutrons, thereby acting as reactor poisons; thus, additional reactivity must be provided to overcome the gradual poison build-up, and also to compensate for the gradual burn-up of fissionable material. Another reason for providing excess reactivity in reactors where fission product gases are not removed is to override the xenon effect upon shutdown of the reactor. Xenon, which has an extremely high thermal neutron absorption cross-section, is formed primarily by decay of its precursor, Iodine-135, and is removed by neutron capture as well as by decay. When the reactor is shut down, the xenon build-up continues at a faster rate than its radioactive decay due to the absence of fission neutrons, reaching a maximum about 12 hours after shutdown. To start the reactor during this period, considerable excess reactivity must be provided to override the xenon poisoning.

Nuclear reactors are generally controlled by use of control rods, and in some reactors certain fuel channels have been loaded with slugs of neutron absorbers such as cadmium to supplement the control rods. This combination provides a means for controlling excess reactivity and can further be used for power distribution purposes. However, a number of disadvantages are apparent with this approach. Principal of these is that a substantially flat thermal neutron flux across the reactor core is difficult to achieve. The flux is generally greatest at the center of the core, and since the power level is limited by the temperature of the hottest region of the core, it is important to minimize this effect. With sole reliance on control rods and poison slugs, considerable perturbation of the flux occurs over the absorber and in empty portions of control rod channels. Adjustments in the number and positions of the slugs must be based upon the power distribution for the previous operating period, and no exact means is available to determine the effect of loading changes made during the same shut-down period. Equipment for making adjustments in the slug positions during operation has been developed, but these offer operational problems and reduce available space for uranium loading. Furthermore, such control devices are not fully protective of a reactor during a sudden power surge. For these reasons, ideal control of the flux pattern across the core is seldom realized.

An object of this invention, therefore, is to provide a method of controlling the reactivity in a nuclear reactor. Another object of this invention is to provide a means of controlling the reactivity during the start-up of a nuclear reactor. Another object is to provide the coolant tubes of a nuclear reactor with coating means for auxiliary control. Still another object is to provide a method of protecting a nuclear reactor in the event of a reactivity surge. Yet another object is to provide such control means which may be inserted and removed from the reactor coolant tubes as desired. Further objects and advantages of this invention will be apparent from the following detailed description, the attached claims and the accompanying Figure, which represents a typical positioning of coolant tube coating means exteriorly of a nuclear reactor.

The present invention provides a method of supplementary control over a nuclear reactor which is equipped with cooling means or which has a system of coolant channels in its core comprising providing a solution containing a neutron absorbing material, injecting the neutron absorbing material solution into the cooling means or into a coolant channel in the nuclear reactor and depositing said material on the interior surface of the walls of said cooling means or coolant channel. In an embodiment of this invention, the neutron absorbing material or neutron poison is introduced into the coolant and circulated through the coolant channels in elemental form or in the form of a chemical compound as more fully described hereinbelow. A carrier or solvent vehicle in the form of an organic, organometallic or inorganic compound, or water is also employed to facilitate introduction of the neutron poison material into the coolant.

Introduction of the neutron poison into the coolant system of a nuclear reactor has the advantage of providing a neutron absorber which is rapidly dispersed throughout the reactor coolant system and therefore provides a more uniform control of the reactor and in addition, the formation of a deposit of the neutron absorbing material on the inside of the coolant channel walls serves to anchor the material and provide for maximum neutron absorption effectiveness per unit amount of material introduced. The deposit is formed either by simple deposition and adherence or actual chemical reaction between the poison and the substance of which the coolant channel walls are composed. Thus a neutron-poison control agent is introduced into a reactor and remains therein after the process of injection of the neutron poison into the coolant system has ceased. The neutron poison is removed from the walls by means of solvents and chemical compounds which solvate or react with the deposited coating.

It is to be understood that the injection into the coolant and the coating principle provides additional control over the reactor and is not intended to replace the conventional control rod system.

The neutron poison-containing material may be applied to the walls of the coolant channels in varying amounts. An embodiment of this invention constitutes the injection into the coolant system of a nuclear reactor an amount of neutron absorbing material, of the type described elsewhere in this writing, to provide a deposit on the interior surface of the coolant channels having a neutron-absorbing capacity sufficient to reduce a predetermined neutron multiplication factor by a predetermined factor. A further embodiment constitutes injecting into the coolant system of a nuclear reactor at a predetermined flux level, an amount of neutron-absorbing material to provide a deposit on the interior surface of the coolant channels having a neutron-absorbing capacity sufficient to reduce the neutron multiplication value below a value of unity. The latter embodiment serves to provide a safety measure in the operation of a nuclear reactor. The coating and the removing agent used may be of such nature as to seal off any leaks through the coolant channel walls to prevent flow of poison into the reactor moderator. The coating naturally will not interfere significantly with coolant flow during its application or its removal.

Various advantages are apparent for this control means. These include unlimited reactivity control without removal of fissionable material and continuous reactivity adjustment either for the entire reactor or for selected regions. Xenon override is considerably facilitated since some of the poison material applied as coolant channel coatings can be removed when an emergency shutdown runs over the normal recovery time. The poison increases the total control available to the operator during start-up and eliminates the necessity of reducing power if control rod capacity is insufficient to cover the initial absence of xenon poisoning, thereby allowing an almost immediate rise to normal operating level. The poison solution can be versatily used for control purposes, being injected and removed as required. By storing the coating material within the reactor in a manner providing for injection responsive to reactivity excursions, possible damage to the reactor is prevented. The poison coating also has the distinct advantage over the poison tube in that shutdown is not required for poison column discharge. Furthermore, an even coating of the coolant channels does not cause severe flux perturbation and substantially aids in flattening the flux; this permits an increase in reactor efficiency and permissible power level.

Cooling of a nuclear reactor is accomplished by providing a coiled tube or a series of coolant passages extending through the reactor. The nuclear reactor system to which the present invention is applicable has ordinary water, $D_2O$, sodium, or a hydrocarbon such as terphenyl or other polyphenyl, flowing through the channels at a velocity sufficient to remove the heat from the reactor core. Coolant velocity varies with the reactor design, a range for an unpressurized, water-cooled, graphite-moderated reactor being 20 to 40 feet per second. The temperature of the coolant likewise varies with the particular heat transfer or operating condition and degree of pressurization, a typical range for an isotope producing water-cooled reactor being from possibly 0°C at start-up to 90°C during full operation.

In order to provide for appreciable neutron absorption and consequently effective reactor control with a minimum of neutron poison material, the neutron absorbing element should have a neutron capture cross-section of at least about 3 barns. Hence the use of neutron posion material containing elements which have a neutron capture cross-section of at least about 3 barns, such as chromium with a neutron capture cross-section of 3.1 barns, constitutes an embodiment of this invention. Non-limiting examples of substances which satisfy this requirement are materials which include, among others, the elements boron, cadmium, chromium, indium, rhodium, hafnium, irridium, and elements of the rare-earth series. The elements of the rare-earth series which satisfy the cross-section requirement are those having atomic numbers 59, 60 and 62–71.

One form in which the poison material is introduced into the cooling system is in elemental form, that is as pure boron, cadmium, hafnium, dysprosium, europium, gadolinium, or samarium, etc. In this form it is introduced as a fine suspension in a carrier vehicle of which paint, varnish and lacquer are illustrative examples. In the same manner the oxides of these elements are employed. Another form in which the poison material is introduced is as organometallic compounds which include chelates of the neutron poison material. Inorganic compound derivatives and inorganic salts of the neutron absorbing elements is still another form in which these materials are introduced into the cooling system.

A class of boron compounds that is employed has the general formula

in which R is selected from the class consisting of a hydrocarbon group having from about 2 to about 12 carbon atoms, and a hydrocarbonoxy group having the general formula —OR' which is bonded to the boron by a boron-oxygen bond and in which R' is a hydrocarbon group having from about 2 to about 12 carbon atoms. Y and Z may be the same or different and each may be an R group, an OR' group and a hydroxy group. When there is more than one R in a molecule, the R-groups may be the same or different. In like manner when there is more than one OR' group in the molecule, the R' groups may be the same or different. Non-limiting examples of these compounds are ethyl boric acid, butyl boric acid, diphenyl boric acid, triphenyl borate, tri-α-naphthyl borate, tri-p-tolyl borine, tri-p-xylyl borine and tri-ethylnapthyl borine.

When the chelates of the neutron absorbing materials are employed they are any of the various kinds of chelates that are disclosed in a text entitled "Chemistry of the Metal Chelate Compounds", by Martel and Calvin, 1952 Ed., published by Prentice Hall, Inc., New York. One example is the hydrocarbon non-heterocyclic polyamine chelates in which the chelating agent has from about 2 to about 12 carbon atoms and from about 2 to about 6 nitrogen atoms. Non-limiting examples of such chelates are the ethylene diamine chelate of boron, the diethylene triamine chelate of cadmium, the pentaethylene hexamine chelate of gadolinium, the triaminotriethylamine chelate of samarium, the ortho phenylene diamine chelate of dysprosium, etc.

Examples of compounds in which the chelating agent is an alpha, beta-dihydroxy hydrocarbon compound are the ethylene glycol chelate of boron, the 1,2-dihydroxypropane chelate of cadmium, the 1,2-dihydroxyhexane chelate of europium. Similar chelates are obtained with ortho diphenols, such as the pyrocatechol chelate of boron. In these chelates, the chelating agent is a hydrocarbon compound having an OH group on each of two adjacent carbon atoms, and has from about 2 to about 6 carbon atoms.

Non-limiting examples of compounds in which the chelating agent is an aromatic aldehyde include the salicylaldehyde chelate of boron, the 4,6-dimethylsalicylaldehyde chelate of cadmium, the 3-ethoxysalicyladehyde chelate of samarium, the 2-hydroxy-1-naphtahldehyde chelate of gadolinium, etc. These aldehydes have from about 6 to about 10 carbon atoms and from 1 to 2 oxygen atoms. Examples of beta diketone chelate compounds in which the chelating agent has from about 5 to about 10 carbon atoms include the acetylacetone chelate of boron, the benzoylacetone chelate of gadolinium, the acetylacetone chelate of cadmium and benzoylacetone chelate of europium.

Other compounds of the boron, cadmium, rare earth, etc., neutron-absoring materials that can be used are those in which the chelating agents are the beta dioximes, the 2-hydroxyazo compounds, as well as compounds such as the 8-hydroxy quinoline chelate of cadmium and the 1-hydroxy anthraquinone chelate of samarium.

Non-limiting examples of compounds in whith the chelating agent is an alpha amino organic fatty acid are $\alpha$-aminoacetic acid chelate of boron, $\alpha$-aminoisobutyric acid chelate of cadmium, $\alpha$-amino octanoic acid chelate of lanthanum and $\alpha$-amino acetic acid chelate of boron. The number of carbon atoms in this type of chelating agent is from about 2 to about 8 carbon atoms.

Amino acetic acids in which there are two acetic acid groups per N atom constitute another class of chelating agent which is used to form neutron poison compounds such as the ethylenediaminetetraacetic acid chelate of gadolinium, etc. Other chelates are the citric acid chelates of boron, cadmium, gadolinium, dypsprosium, europium and samarium, etc. Still other chelates of the reactor poison materials of this invention will be apparent to those skilled in the art.

When the neutron poison is injected into the coolant system of a nuclear reactor in the form of an inorganic compound, the compound has one of the general formulae $MX_n$, $M(NO_3)_n$, $M_m(SO_4)_{mn/2}$ in which M is a neutron absorbing basic element having a neutron capture cross-section of at least about 3 barns; X is a halogen selected from the class consisting of fluorine, chlorine, bromine and iodine; $n$ is an integer selected from the group consisting of two and three and represents the valence of the neutron poison M; and $m$ is an integer having a value selected from the group consisting of one and two such that the term $mn/2$ represents a small whole number. One class of M elements are the metal elements which have a neutron capture cross-section of at least about 3 barns.

Examples of compounds having the general formula $MX_n$ are cadmium chloride, cadmium iodine, dysprosium chloride, europium bromide, gadolinium chloride, luticium fluoride, samarium dibromide, samarium dichloride, samarium trichloride, etc. Examples of compounds having the general formula $M(NO_3)_n$ are cadmium nitrate, chromium nitrate, dysprosium nitrate having the formula $Dy(NO_3)_3 \cdot 5H_2O$, gadolinium nitrate having either 5 or 6 molecules of water of hydration, and luticium nitrate. Examples of compounds having the general formula $M_m(SO_4)_{mn/2}$ are cadmium sulphate, having one or four molecules of water of hydration per molecule, dysprosium sulphate having the formula $Dy_2(SO_4)_3 \cdot H_2O$, gadolinium sulphate having the formula $Gd_2(SO_4)_3$ and also the same compound having 8 molecules of water of hydration per molecule, and samarium sulphate having the general formula $Sm_2(SO_4)_3 \cdot 8H_2O$.

Another class of compounds found very effective as a cooling system neutron poison are the fluoborates having the formula $M'(BF_4)_n$ where M' is a basic neutron-absorbing element having a neutron capture cross-section of at least about 3 barns and $n$ is as defined above. Non-limiting examples are cadmium fluoborate and samarium fluoborate.

Still other compounds are the neutron poison element salts of fatty acids such as tetrabutyltitanate, cadmium octoate, gadolinium dodecanoate, etc. In these compounds the fatty acid has from about 4 to about 12 carbon atoms.

The above specific examples of neutron poison compounds that are used in this invention are illustrative only. Other hydrocarbon derivatives of these compounds as well as chelates and inorganic compounds will be apparent to those skilled in the art.

The choice of a carrier vehicle for the neutron poison material will depend upon whether or not it is desired that the vehicle be radiation-resistant. It is known that many organic compounds will be decomposed under radiation and the composition originally deposited upon the coolant wall may be removed due to radiation effects. Advantage might be taken of this effect, however, when the poison effects are needed for only a short time. Radiation resistance will also determine whether the organic vehicle is to be stored out of the reactor external to the radiation field or is to be kept within the reactor. In either case, the material may be kept in a container which releases the poison to the coolant tube by the action of means responsive to temperature or flux changes, for example a valve plug of a low melting composition such as solder.

The vehicles for the organo-metallic neutron poisons which are suitable are the relatively low molecular weight ethers, such as diethyl and dipropyl ether, ketones such as methyl ethyl ketone and acetone, alcohols such as ethanol, butanol, etc. A particularly suitable vehicle is an organic mixture comprising 25–40% phenol, 10–30% glycerol ester of maleic acid synthetic resin, 35–55% of a methyl ester resin of abietic acid, and one-half–5% of ethyl cellulose, the latter substance serving to give an adhesive quality to the overall coating. The optimum operable solvent contains 37.5%, 15%, 45% and 2.5%, respectively, of each of the above compounds. An operating temperature coating range of from 55°–70°C is found satisfactory with such a mixture. The preparation of the above esters is well-known to those skilled in the art and is described in the technical literature such as the text "Organic Chemistry" by Fieser and Fieser, published by D. C. Heath and Company, Boston.

The mechanism of the deposition or coating is not completely clear and no particular theory is adhered to. In one embodiment of this invention, the auxiliary control with a poison material is accomplished by providing a poison-containing material in the form of a water insoluble solute in a water soluble solvent or vehicle. If such solvent and a solute is added to the water, the water itself acts as a solvent for the vehicle, the solute being insoluble in the resultant solvent-water solution. This results in precipitation of the poison-containing solute out of the solvent-water solution onto the inner surface of the coolant system walls. The latter is the case when the neutron poison material is an organometallic compound such as a chelate and the vehicle is acetone or methyl ethyl ketone. Another example is a composition of cadmium octoate together with a carrier of phenol, methyl alcohol and nylon injected into the water coolant system of a nuclear reactor. The dilution of phenol and methyl alcohol with water causes the nylon to settle out on the inner surfaces of the coolant channels carrying with it the neutron absorbing cadmium compound. Other examples are given below.

In addition to organic vehicles, inorganic and aqueous vehicles are also used. In various embodiments of this invention, the neutron poison material is carried in water as a true solution, or as a suspension or slurry. The silicone resin polymers described in a text "An Introduction to the Chemistry of Silicones" by Eugene B. Rochow, second Ed., 1951, published by John Witey and Sons, Inc., New York, are likewise used as carriers since they have an affinity for metal surfaces and especially aluminum and give good adhesion characteristics. In one embodiment, the resin polymers are pigmented with the neutron poisons and are injected into the coolant stream in the form of dispersion. Suitable inorganic salts for use with the inorganic and aqueous vehicles include the soluble nitrates, sulphates, and halides, as indicated above. The concentration of neutron absorbing elements which have a neutron capture cross-section of at least about 3 barns can vary from about 0.5 weight percent as in the case of a cadmium sulfate solution, to 100 weight percent in the case of pure powdered cadmium metal being fed into the coolant stream.

One method of coating the coolant tubes is for chemical reaction to occur between the poison material and the coolant wall. This requires that the poison metal ion must be lower in the electromotive force series of the elements than the metal of the coolant wall, commonly aluminum or stainless steel, by which it is being replaced. For example, the mechanism of the deposition of cadmium metal on aluminum follows the reaction: $3 Ca^{++} + 2 Al \rightarrow 3 Cd + Al^{+++}$. An aqueous cadmium chloride or cadmium fluoborate solution is used for this purpose and in this case the addition of hydrogen fluoride thereto has been found to enhance the plating out characteristics.

When no longer required for reactor control, the coating is removed from the coolant wall in various ways. Organic coating compositions subject to radiation damage are removed as the molecular structure decomposes under radiation. The organic vehicle is also removed by common solvents such as the relatively low molecular weight ethers as for example diethyl ether and dipropyl ether; ketones such as acetone and methyl ethyl ketone; and alcohols such as ethanol, butanol, etc. Chlorinated hydrocarbons, such as methylene dichloride, chloromethane, carbon tetrachloride, or trichloroethylene have been found satisfactory for removing the paint-like mixture from the surfaces of the coolant channel. Aqueous mineral acids such as nitric and sulfuric acids can also be used.

The accompanying schematic drawing serves to illustrate a typical apparatus for practicing the method of this invention. A nuclear reactor 1, having structural walls 2 and a reactor core within the space 3 which, in operation, is covered by a cover (not shown), is provided with coolant tubes 5 passing therethrough. Coolant is pumped through the tubes 5 by means of a pump 4 which passes coolant, typically water, through main pipe 9, riser pipes 8 and header pipes 7 connected to tubes 5. The water passed through tubes 5 may be recycled or sent to waste from the opposite side of the reactor. The actual positioning of the poison injecting means is dependent generally on the particular reactor design, the coolant flow and the desired degree of control over the reactor reactivity.

Two types of poison injecting means are illustrated in the drawing. When it is desired that all reactor tubes 5 be coated internally, entry of the poison to the coolant stream is provided through conduit 12. The poison is stored in chamber 10 typically in the form of one of the solutions set out above. A pressurizing means 11, actuated by an electrical signal carried by leads on 13 and 14, and possibly received from a reactivity sensing device, such as an ionization chamber, is provided to force the poison material in 10 through one-way valve 19 and conduit 12 into the flowing coolant. The electrical signal imposed on leads 13 and 14 may trigger a solenoid 17 which opens a valve 18 between a pressurized inert gas in means 11 and the poison material in chamber 10. The solenoid 17 or valve 18 may be operated automatically or may be manually operable.

The illustrated apparatus also includes poison injecting means in each of the horizontal headers of the cooling system. Pressurized flow of the poison-containing substance is provided from chamber 15 into the header 7 under the control of an automatically or manually actuatable valve 16. Flow is thus provided along the particular header and into the tubes leading therefrom. It can be seen that poison injecting means may be provided on a single coolant tube or any desired series thereof.

The injection of the reactor poison into the water or other coolant may be in response to a sensing of the attainment of a predetermined flux level in the nuclear reactor. Likewise, the injection may be made manually during the control procedures and at the start-up and/or shutdown of a nuclear reactor. Provision is also made in the present invention for the removal of the coating from the cooling tubes whenever it is necessary to do so. Removal may be made by providing a substance which coats the tube and is washed away by the normal flow of the reactor coolant, or by adding an acid or solvent to the coolant to rapidly remove the deposited neutron absorbing material from the walls.

The following examples illustrate Applicant's process of supplementing nuclear reactor control by passing neutron poison material through the cooling system:

EXAMPLE I

The reactor characteristics shown below are those of the 50 kilowatt water boiler nuclear reactor described and shown in the publication No. 0-346804 entitled "Research Reactors" 75(1955) which can be obtained from the U.S. Government Printing Office. The cooling system in the core is shown and described in "The Proceedings of the Conference on the Peaceful Uses of Atomic Energy", Vol. 2, pp. 372–391, and in a bulletin on the Medical Research Reactor at the Univ. of California at Los Angeles, designated as "Publication NAA-AER-1467", available from Atomics International, Canoga Park, Calif.

The reactor fuel consists of an aqueous uranyl sulphate solution containing 112 grams per liter of uranium, 19 ppm. of iron in the form of ferric sulphate, 19 ppm. of copper in the form of copper sulphate and 0.26 mol. per liter of sulfuric acid. The uranium contains approximately 90% of U-235. The characteristics of the reactor are as follows:

| | |
|---|---|
| Design Power | 50kw |
| Zero Power Critical Mass | 1200gm $U^{235}$ |
| Maximum thermal Neutron Flux | $1.7 \times 10^{12}$ n/cm$^2$-sec |
| Mass Coefficient of Reactivity | 0.024%/gm |
| Temperature Coefficient of Reactivity | 0.25%/°C |
| Power Coefficient of Reactivity | 0.006%/kw |
| Fuel Solution Temperature of 50kw | 80°C |
| Excess Reactivity at 20°C, Zero Power | 3% |
| Reactivity Held in Control and Safety Rods | 7.2% (1.8% each rod) |
| H:$U^{235}$ Atomic Ratio | 300 |
| $U^{235}$ Concentration | 105 gm/liter |
| Power Density, Maximum | 5.5 watt/cm$^3$ |
| Power Density, Average | 3.85 watt/cm$^3$ |

The cooling coil within the reactor is made of stainless steel.

A neutron poison material consisting of a solution of 50 weight percent cadmium octoate in a composition consisting of 37.5 parts of phenol, 15 parts of the resin of the glycerol ester of maleic acid, 45 parts of the resin of the methyl ester of abietic acid and 2.5 parts of ethyl cellulose is contained in a storage chamber attached to the cooling coil on the outside of the reactor core tank. The storage chamber and mechanism for injecting the neutron-absorbing poison material into the cooling tube is similar to that described hereinabove and shown in the accompanying FIGURE wherein it is identified by numbers 9–14 and 7–19. The pressurizing means 11 consists of a container filled with argon under pressure with external means for controlling the pressure. An ionization device, not shown in the figure, mounted adjacent to the core tank, functions to actuate a valve 18 between the pressure chamber 11 and the neutron-absorbing poison storage chamber 10, allowing argon under pressure to force the neutron absorbing material through a one-way valve 19 and conduit 12 into the flowing coolant. At a flux level of $3 \times 10^{12}$ thermal neutrons per cm$^2$-sec, the ionization device actuates valve 18 causing argon under 1000 psi to force an amount of the neutron-absorbing composition equivalent to 8 gm of cadmium into a moving stream of cooling water at 25°C flowing at a rate of 20 ft per second. a determination of the amount of cadmium in the cooling water emerging from the core coil shows that substantially 6 gm of cadmium is deposited on the internal surface of the cooling tube within the reactor core. The neutron multiplication factor is reduced by about 3%. Later, with cadmium control rods in effect, the poison is removed by injecting trichloroethylene into the inlet side of the cooling tube from a storage tank by means of a connecting remotely controlled valve. The trichloroethylene is passed through the cooling system until trichloroethylene emerging from the system is substantially free of the neutron absorbing material which had been deposited on the walls. On operation of the reactor thereafter it is found that the available reactivity is substantially the same as before injecting the neutron absorbing material into the cooling system. This indicates that substantially all the poison is removed from the inner surface of the cooling channels by the solvent.

Similar results are obtained when a solution of 50 weight percent cadmium fluoborate in a vehicle consisting of 1 part by weight of butyl alcohol and 1 part butyl titanate is injected into the cooling system as described in Example I.

EXAMPLE II

Following the procedure of Example I, an aqueous solution of cadmium chloride and hydrofluoric acid which was 3 molar in cadmium and 1 molar in HF is injected into the cooling system of an MTR reactor of the kind described in the publication "The Materials Testing Reactor and Related Research Reactors" by Weinberg et al., International conference on the Peaceful Uses of Atomic Energy, Vol. II, pp. 402–419, and in the publication described above entitled "Research Reactors", page 153 et seq (1955), at a thermal neutron flux of $1 \times 10^6$ neutrons per cm$^2$-sec-watt. An amount of neutron absorbing material equivalent to substantially 25 gm of cadmium is injected. The cadmium plates out on the inner surface of the aluminum coolant channels, reducing the neutron multiplication factor by substantially 4% and bringing it down to a value of less than 1. When the reactivity is held in check by conventional cadmium control rods, the deposit is removed by circulating dilute aqueous $HNO_3$ solution through the cooling system.

Similar results are obtained when the neutron absorbing solution which is injected into the cooling system in Example II consists of a 0.09 molar cadmium sulfate and 3 molar HF aqueous solution, and also when the neutron absorbing solution contains essentially water and cadmium sulphate and the amount of cadmium sulfate is equivalent to 0.5 wt percent cadmium based on the weight of the solution.

When 2.4 gm of boron in the form of diphenyl boric acid in a 50 weight percent ether solution is added to the cooling system as described in Example I, the neutron multiplication factor is reduced by substantially 3%. Other compositions which act in a similar manner are 4 gm of boron in the form of ethyl boric acid in an ether solvent which reduces the neutron multiplication factor by substantially 5%; 5 gm of boron in the form of tri-p-xylyl borine in a chloroform solvent which reduces the neutron multiplication factor by substantially 6%; 4 gm of boron in the form of pyrocatechol chelate of boron in an equal amount of chloroform as solvent which reduces the neutron multiplication factor by substantially 5%; 2 kg of praseodymium in the form of a 4,6-dimethyl-salicylaldehyde chelate as a 40 wt percent solution in a 3-to-1 acetone-amyl acetate solvent which reduces the neutron multiplication factor by substantially 3%; 180 gm of luticium in the form of the 8-hydroxyquinoline chelate as a 50 wt percent solution in an ether solvent which reduces the multiplication factor by substantially 3%; 4 gm of gadolinium in the form of 2-hydroxy-1-naphtahldehyde chelate in a 60 wt percent chloroform solvent solution which reduces the multiplication factor by substantially 15%; 300 gm of hafnium in the form of the benzoyl acetone chelate in a 30 wt percent solution of ethyl acetate as a solvent which reduces the multiplication factor by substantially 3%; 3.6 gm of boron in the form of the $\alpha$-amino acetic acid chelate in chloroform which reduces the multiplication factor by substantially 4.5%; and 6 gm of cadmium in the form of cadmium naphthenate in an ether solvent which reduces the neutron multiplication factor by substantially 3%. When 12 Kg of chromium with a neutron capture cross-section of 3.1 barns in the form of chromium nitrate in a water solution is added to the cooling system of an MTR reactor as described in Example II, the neutron multiplication factor is reduced by substantially 4%. In like manner, 40 gm of samarium in the form of samarium sulphate, $Sm_2(SO_4)_3 \cdot 8H_2O$, in a water solution reduces the multiplication factor by substantially 15%.

In like manner additional control is provided for sodium-cooled reactors and organic moderated reactors by injecting a neutron absorbing composition into the coolant system and depositing it on the inner surface of the coolant channels within the reactor core.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A method of controlling reactivity in a nuclear reactor which is cooled by water flowing through coolant channels within the reactor core, said coolant channels being of a metal selected from the group consisting of aluminum and stainless steel, which comprises providing a neutron absorbing solution consisting of a cadmium compound selected from the group consisting of cadmium chloride and cadmium fluoborate, together with hydrogen fluoride, said solution being about 3 molar in the cadmium compound and about 1 molar in hydrogen floride, injecting said solution at a predetermined flux level into said water flowing through said coolant channels, circulating said solution through said channels and thereby causing at least part of said cadmium from said solution to deposit on the interior walls of said channels, thereby reducing the neutron multiplication factor of said reactor.

* * * * *